United States Patent
Notaro et al.

[11] Patent Number: 5,934,081
[45] Date of Patent: Aug. 10, 1999

[54] CRYOGENIC FLUID CYLINDER FILLING SYSTEM

[75] Inventors: John Notaro, West Seneca; Erwin Schulze Beckinghausen, Jr.; Bruce Hall Davidson, both of East Amherst, all of N.Y.; Thomas Edward DeBriae, Cincinnati, Ohio

[73] Assignee: Praxair Technology, Inc., Danbury, Conn.

[21] Appl. No.: 09/017,731

[22] Filed: Feb. 3, 1998

[51] Int. Cl.$^6$ .................................................... F17C 9/02
[52] U.S. Cl. ............................................. 62/50.2; 62/50.6
[58] Field of Search ................................ 62/50.1, 50.2, 62/50.6

[56] References Cited

U.S. PATENT DOCUMENTS

| | | | |
|---|---|---|---|
| 3,091,096 | 5/1963 | Rendos et al. | 62/50.2 |
| 4,881,374 | 11/1989 | Mattiola et al. | 62/50.6 |
| 4,881,375 | 11/1989 | Mattiola et al. | 62/50.6 |
| 4,887,857 | 12/1989 | VanOmmeren | 141/1 |
| 5,107,906 | 4/1992 | Swenson et al. | 62/50.2 X |
| 5,325,894 | 7/1994 | Kooy et al. | 62/50.2 X |
| 5,373,702 | 12/1994 | Kalet et al. | 62/50.2 |
| 5,520,000 | 5/1996 | Pevzner | 62/48.1 |

OTHER PUBLICATIONS

Computerized Cylinder Filling Technology, Carlson, Cryo-Gas International, Aug./Sep., 1993, pp. 12–15.

Primary Examiner—Christopher B. Kilner
Attorney, Agent, or Firm—Stanley Ktorides

[57] ABSTRACT

A system for rapidly filling cylinders with gas while avoiding superambient temperature excursions of the cylinder contents wherein cylinder charging gas is produced by vaporizing pressurized cryogenic liquid in admixture with pressurized gas to simultaneously in one step produce the charging gas and control the temperature of the charging gas to enable the subsequent rapid filling rate.

7 Claims, 1 Drawing Sheet

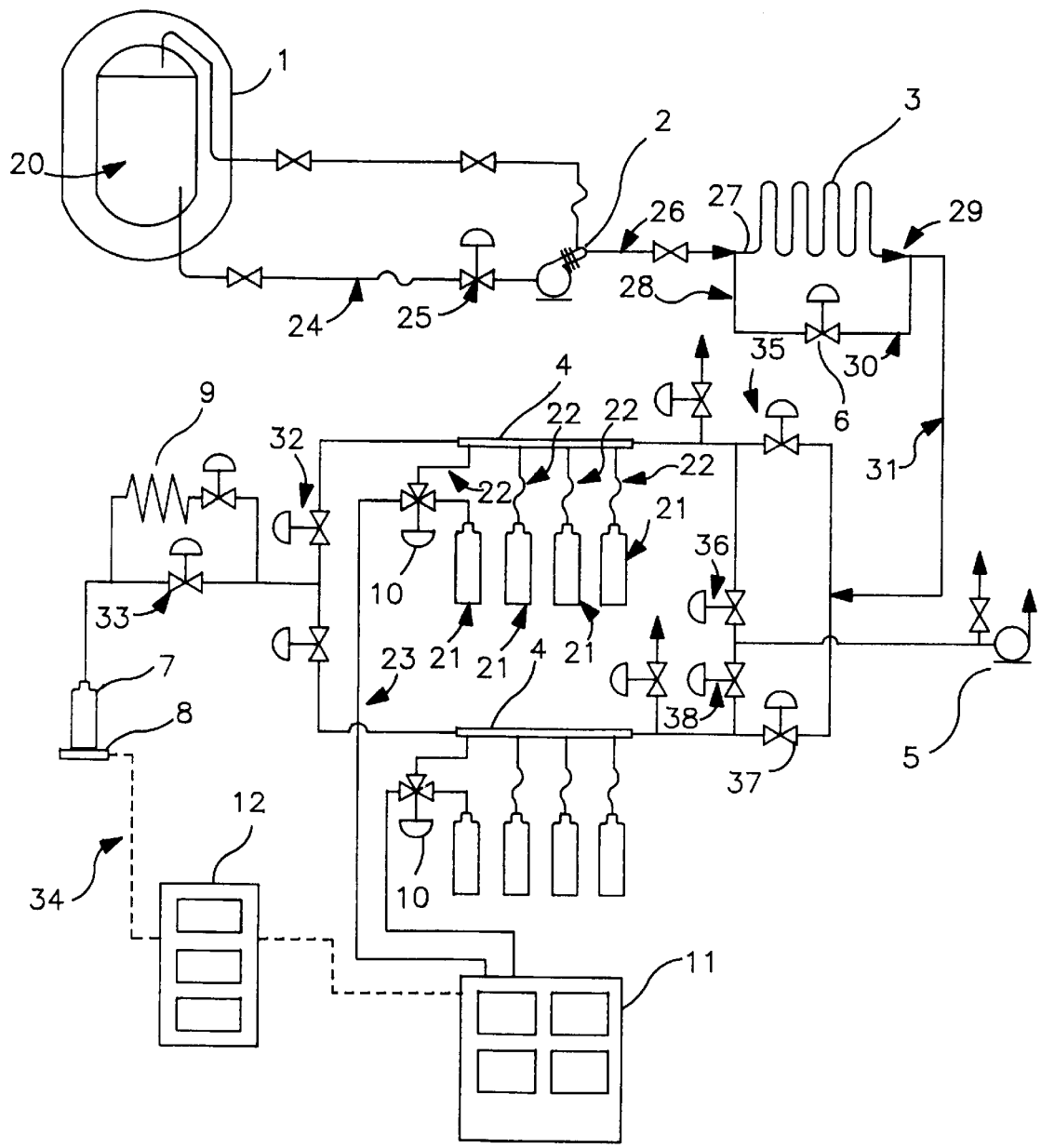

CRYOGENIC FLUID CYLINDER FILLING SYSTEM

TECHNICAL FIELD

This invention relates generally to the filling of cylinders and, more particularly, to the use of cryogenic fluid to fill cylinders with gas at high pressure.

BACKGROUND ART

Gas-filled cylinders are employed in a great many uses. For example, cylinders filled with oxygen are used to dispense oxygen to patients for medical use. Cylinders filled with argon are used to dispense argon to a welding operation for shielding gas purposes. Cylinders filled with nitrogen are used in many applications to dispense nitrogen for inerting purposes. Cylinders filled with helium are used to dispense helium into inflatable structures for lifting purposes. Cylinders filled with hydrogen or a hydrocarbon as used to dispense such gas for combustion. Cylinders filled with carbon dioxide are used to dispense carbon dioxide for carbonation of beverages. Gas mixtures are also widely used by being dispensed from cylinders.

Cylinders typically are of relatively small size, usually within the range of from 0.01 to 2.0 cubic feet water volume, so that they can be easily transported from a filling station to the use point. Generally, cylinders are filled with gas at a centralized filling station and transported from the filling station to the use point. The cylinders are filled with gas under a high pressure, typically exceeding 2000 pounds per square inch absolute (psia), so that the amount or mass of gas packed into the cylinder is maximized.

In the filling of cylinders, as the gas flows from a storage vessel into the cylinder and the pressure within the cylinder increases, owing to the fixed volume of the cylinder, the temperature of the gas within the cylinder rises following the ideal gas law relation. It is important that the temperature of the gas within the cylinder not significantly exceed the ambient temperature. If it were to exceed the ambient temperature, then less gas can be put into any given cylinder at any given pressure and, as the gas contents of the cylinder settle to the ambient temperature, the cylinder becomes only partially filled and is delivered from the filling station to the use point with significantly less gas than could otherwise have been delivered.

In order to avoid this problem of high gas temperature within the cylinder as the cylinder is being filled with pressurizing gas, practitioners fill cylinders at a slow rate, typically about 100 psi per minute, such that the heat increase caused by the increasing pressure within the cylinder roughly equals the heat dissipation rate from the cylinder walls to the environment. In this way the temperature of the cylinder contents does not significantly exceed the ambient temperature. This procedure effectively addresses the cylinder partial charging problem, but it is time consuming and therefore costly and inefficient.

Accordingly it is an object of this invention to provide a cylinder filling system which will enable the filling of cylinders with gas to a high pressure at a rate significantly higher than that heretofore possible without encountering a heat buildup problem which raises the temperature of the cylinder gas contents significantly above ambient temperature.

SUMMARY OF THE INVENTION

The above and other objects, which will become apparent to those skilled in the art upon a reading of this disclosure, are attained by the present invention, one aspect of which is:

A method for filling a cylinder with gas comprising:

(A) pumping a cryogenic liquid to an elevated pressure to produce elevated pressure cryogenic liquid;

(B) vaporizing a first portion of the elevated pressure cryogenic liquid to produce elevated pressure gas;

(C) mixing a second portion of the elevated pressure cryogenic liquid with the elevated pressure gas, and vaporizing the second portion of the elevated pressure cryogenic liquid by direct heat exchange with the elevated pressure gas to produce controlled temperature elevated pressure gas; and (D) passing controlled temperature elevated pressure gas into a cylinder.

Another aspect of the invention is:

Apparatus for filling a cylinder with gas comprising:

(A) a cryogenic liquid storage tank, a liquid pump, and means for passing cryogenic liquid from the cryogenic liquid storage tank to the liquid pump;

(B) a vaporizer, inlet means for passing cryogenic liquid from the liquid pump to the vaporizer, and outlet means for passing gas out from the vaporizer;

(C) a bypass valve, a first passage communicating between the inlet means and the bypass valve, and a second passage communicating between the bypass valve and the outlet means; and (D) a cylinder and means for passing gas from the outlet means into the cylinder.

As used herein, the term "cryogenic liquid" means a fluid having a temperature at or below −40° F.

As used herein, the term "direct heat exchange" means the bringing of two fluids into heat exchange relation with contact or intermixing of the fluids with each other.

BRIEF DESCRIPTION OF THE DRAWING

The sole FIGURE is a schematic representation of one particularly preferred embodiment of the invention wherein at the filling station a plurality of cylinders are filled simultaneously through a manifold.

DETAILED DESCRIPTION

The invention will be described in detail with reference to the Drawing. Referring now to the FIGURE, cryogenic liquid storage tank 1 contains cryogenic liquid 20. Among the cryogenic liquids which can be used in the practice of this invention one can name oxygen, nitrogen, argon, helium, carbon dioxide, hydrogen, methane, natural gas and mixtures of two or more thereof.

When cylinder filling is desired one or more cylinders 21 are connected by charging line or lines 22 to charging rack or manifold 4. The embodiment of the invention illustrated in the FIGURE shows four such cylinders 21 connected to manifold 4 ready for filling. There is also illustrated a second array of four cylinders connected for charging. In actual practice, while the first array is being charged the second array is being connected and evacuated by pump 5. After the first array of cylinders is filled, gas flow to these cylinders is stopped by closing the appropriate valves, and gas flow into the second array of cylinders is started by opening the appropriate valves. While the second array of cylinders is being filled, the filled cylinders of the first array are disconnected and readied for shipment to the use point, and empty cylinders are connected to the manifold for charging after the charging of the second array of cylinders is completed. The procedure is repeated until all the desired number of cylinders are filled. The FIGURE illustrates four cylinders connected to the manifold in each array. From 1 to several hundred cylinders may be filled simultaneously in a manifolded array in the practice of this invention. The FIGURE also illustrates the use of a valve 10 on one of the charging lines 22 which is used to divert gas by means of conduit 23 to analyzer 11 which monitors the purity of the gas being charged into the cylinder(s).

Cryogenic liquid is withdrawn from cryogenic liquid storage tank 1 in line 24 through valve 25 by means of cryogenic liquid pump 2 which pumps the cryogenic liquid to an elevated pressure, generally within the range of from 1000 to 10000 psia. The elevated pressure cryogenic liquid 26 pumped out from cryogenic liquid pump 2 is divided into a first portion 27 and a second portion 28. The first portion 27 comprises at least 60 percent of elevated pressure cryogenic liquid 26 and the second portion 28 comprises up to 40 percent of elevated pressure cryogenic liquid 26.

Vaporizer 3 has an inlet which communicates with cryogenic liquid pump 2 whereby cryogenic liquid is passed from cryogenic liquid pump 2 into vaporizer 3, and has an outlet whereby gas is passed out from vaporizer 3. Any suitable vaporizer, such as a steam heated or electrically heated vaporizer, may be used in the practice of this invention. A preferred vaporizer is the atmospheric vaporizer described and claimed in U.S. Pat. No. 4,399,660—Vogler et al. Within vaporizer 3, the first portion 27 of the elevated pressure cryogenic liquid is vaporized to produce elevated pressure gas 29 which is withdrawn from vaporizer 3 within the outlet.

The second portion 28 of the elevated pressure cryogenic liquid bypasses vaporizer 3. Bypass valve 6 has a first passage which communicates with the vaporizer inlet whereby second portion 28 is passed to bypass valve 6, and has a second passage whereby the second portion of the cryogenic liquid in stream 30 passes from bypass valve 6 to the vaporizer outlet to mix with the elevated pressure gas. Heat from the elevated pressure gas vaporizes by direct heat exchange the second portion of the elevated pressure cryogenic liquid thus producing controlled temperature elevated pressure gas 31 which is at the desired temperature for rapidly filling the cylinder(s) 21. The temperature of the controlled temperature elevated pressure gas 31 is preferably within the range of from −40° F. to −90° F. The temperature of the controlled temperature elevated pressure gas is maintained within the desired range by manipulating bypass valve 6 to be in a more open or more closed position thus varying the portion of elevated pressure cryogenic liquid 26 which forms second portion 28.

The controlled temperature elevated pressure gas 31 is then passed into cylinder(s) 21. Because of the controlled low temperature of the gas being passed into cylinder(s) 21, the gas may be passed into the cylinders at a very high rate, generally within the range of from 200 to 500 psi per minute, which is two or more times faster than is possible with conventional practice without encountering superambient temperatures within the cylinder(s). Typically the final pressure of the gas contents of the filled cylinder(s) 21 is within the range of from 1000 to 10000 psia and the temperature is within the range of from 60° F. to 90° F., i.e. about ambient temperature. Thus, cylinder filling takes only about half as long with the practice of the invention as with conventional practice. When the cylinder(s) are filled, they are disconnected from the manifold arrangement and readied for shipment to the use point as was previously described.

The cylinder filling system of this invention enables a further enhancement to ensure the accuracy of the cylinder filling. In conventional practice a control cylinder is filled simultaneously with the other cylinders and the temperature and pressure of the control cylinder contents are monitored. When the temperature and the pressure of the control cylinder contents indicate that the control cylinder is properly filled, gas flow to all of the cylinders is shut off as this indicates that all of the cylinders are filled. While temperature and pressure monitoring provides reasonable accuracy, temperature and pressure are secondary indicators of cylinder contents. A primary indicator, and therefore a potentially more accurate parameter for cylinder content monitoring, is the mass of the gas contents of the cylinder. The cylinder filling system of this invention uses such a mass monitoring system which is illustrated in the Drawing.

Referring back now to the FIGURE there is shown control cylinder 7 resting on scale 8. To ensure that the initial temperature of control cylinder 7 is the same as that of the product cylinder(s) 21 at the end of the filling cycle, a tuning heat exchanger 9 is installed which heats gas being passed into control cylinder 9 for evacuation after the previous cycle.

In operation, as controlled temperature elevated pressure gas is being passed into product cylinders 21 from manifold 4, it is also passing into control cylinder 7 through valves 32 and 33. The filling of the cylinders 21 is automated and controlled by a programmable controller and computer system 12. The weight read by scale 8 is monitored by system 12 by means of electrical connection line 34 and when this reading indicates that control cylinder 7 is fully filled with gas, system 12 signals the input valve 35 to the first array to close and the input valve 37 to the second array to open to begin the next filling cycle.

Now by the use of the cryogenic fluid cylinder filling system of this invention wherein pressurized gas for cylinder filling is produced in a step which simultaneously controls the temperature of the gas to be at a defined very low temperature prior to the gas being charged into the product cylinder(s), the cylinder charging operation can proceed at a much faster pace than was heretofore possible, increasing the efficiency and lowering the costs of the cylinder filling procedure.

Although the invention has been described in detail with reference a certain preferred embodiment, those skilled in the art will recognize that there are other embodiments of the invention within the spirit and the scope of the claims.

We claim:

1. A method for filling a cylinder with gas comprising:
   (A) pumping a cryogenic liquid to an elevated pressure within the range of from 1000 to 10000 psia to produce elevated pressure cryogenic liquid;
   (B) vaporizing a first portion of the elevated pressure cryogenic liquid to produce elevated pressure gas;
   (C) mixing a second portion of the elevated pressure cryogenic liquid with the elevated pressure gas, and vaporizing the second portion of the elevated pressure cryogenic liquid by direct heat exchange with the elevated pressure gas to produce controlled temperature elevated pressure gas; and
   (D) passing controlled temperature elevated pressure gas into a cylinder.

2. The method of claim 1 wherein the first portion comprises from at least 60 percent and the second portion comprises up to 40 percent of the elevated pressure cryogenic liquid.

3. The method of claim 1 wherein the temperature of the controlled temperature elevated pressure gas is within the range of from −40° F. to −90° F.

4. The method of claim 1 wherein the controlled temperature elevated pressure gas is passed simultaneously into a plurality of cylinders.

5. The method of claim 1 wherein the controlled temperature elevated pressure gas is passed into the cylinder at a charging rate within the range of from 200 to 500 psi per minute.

6. The method of claim 1 wherein the cryogenic liquid comprises one or more of oxygen, nitrogen, argon, helium, hydrogen, methane and carbon dioxide.

7. Apparatus for filling a cylinder with gas comprising:

(A) a cryogenic liquid storage tank, a liquid pump, and means for passing cryogenic liquid from the cryogenic liquid storage tank to the liquid pump;

(B) a vaporizer, inlet means for passing cryogenic liquid from the liquid pump to the vaporizer, and outlet means for passing gas out from the vaporizer;

(C) a bypass valve, a first passage communicating between the inlet means and the bypass valve, and a second passage communicating between the bypass valve and the outlet means; and (D) a plurality of cylinders and means comprising a manifold for passing gas from the outlet means into the cylinders simultaneously, and further comprising a control cylinder on a scale, means for passing gas from the manifold to the control cylinder, a tuning heat exchanger in flow communication with the control cylinder, and a programmable controller computer system in electronic communication with the scale, a gas analyzer and means for passing gas from the manifold to the gas analyzer.

* * * * *